US006486658B2

United States Patent
Naidu

(10) Patent No.: US 6,486,658 B2
(45) Date of Patent: Nov. 26, 2002

(54) ENCODER FOR A PERMANENT MAGNET SINUSOIDAL BRUSHLESS MOTOR IN AN ELECTRIC POWER STEERING SYSTEM

(75) Inventor: Malakondaiah Naidu, Troy, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/784,958

(22) Filed: Feb. 16, 2001

(65) Prior Publication Data

US 2001/0045828 A1 Nov. 29, 2001

Related U.S. Application Data

(60) Provisional application No. 60/183,082, filed on Feb. 16, 2000.

(51) Int. Cl.⁷ .............................. G01B 7/14; G01B 7/30
(52) U.S. Cl. ............................. 324/207.21; 324/207.25
(58) Field of Search ................... 324/207.21, 207.2, 324/207.25, 207.23, 174, 252; 318/727, 138; 180/402, 403

(56) References Cited

U.S. PATENT DOCUMENTS

| | | | |
|---|---|---|---|
| 4,122,478 A | 10/1978 | Gallo et al. | |
| 4,599,561 A * | 7/1986 | Takahashi et al. | 324/252 |
| 4,678,973 A | 7/1987 | Elliott et al. | |
| 4,715,009 A | 12/1987 | Bohmler et al. | 364/565 |
| 4,794,536 A | 12/1988 | Eto et al. | |
| 4,874,053 A | 10/1989 | Kimura et al. | 180/79.1 |
| 5,062,064 A | 10/1991 | Sagues et al. | 364/565 |
| 5,065,324 A | 11/1991 | Oshita et al. | |
| 5,144,564 A * | 9/1992 | Naidu et al. | 364/494 |
| 5,177,417 A * | 1/1993 | Lee et al. | 318/254 |
| 5,203,420 A | 4/1993 | Shiraishi | |
| 5,283,741 A | 2/1994 | Desrus | |
| 5,397,972 A | 3/1995 | Maiocchi | |
| 5,521,475 A | 5/1996 | Fu et al. | |
| 5,739,969 A | 4/1998 | Garza | |
| 5,791,432 A | 8/1998 | Fushimi et al. | |
| 5,892,339 A | 4/1999 | Park et al. | 318/254 |
| 5,898,301 A | 4/1999 | La Croix et al. | |
| 6,014,348 A | 1/2000 | Kim | 363/13 |
| 6,079,513 A | 6/2000 | Nishizaki et al. | |
| 6,289,294 B1 | 9/2001 | Rataj et al. | 702/145 |
| 6,329,782 B1 | 12/2001 | Chen et al. | 318/727 |

* cited by examiner

Primary Examiner—Edward Lefkowitz
Assistant Examiner—Subhash Zaveri
(74) Attorney, Agent, or Firm—Edmund P. Anderson

(57) ABSTRACT

An encoder for a brushless motor of an Electric Power Steering (EPS) system that includes a commutation track coupled to a shaft for the generation of a commutation signal. The commutation signal in turn is used to generate an index signal every electrical cycle. The encoder further includes a set of high-resolution quadrature signal tracks. The set of high-resolution quadrature signal tracks generate a set of high-resolution signals which are phased at a set angular displacement with respect to one another. A set of sensors sense the commutation signal and the set of high resolution quadrature signals.

20 Claims, 3 Drawing Sheets

ENCODER FOR A PERMANENT MAGNET SINUSOIDAL BRUSHLESS MOTOR IN AN ELECTRIC POWER STEERING SYSTEM

CROSS-REFERENCE TO RELATED APPLICATIONS

This application claims the benefit of U.S. Provisional patent application No. 60/183,082 filed Feb. 16, 2000 and which is incorporated herein by reference in its entirety.

TECHNICAL FIELD

This invention relates generally to an encoder, and more particularly, to an encoder for a sinusoidal brushless motor of an Electric Power Steering (EPS) system.

BACKGROUND OF THE INVENTION

Electric power steering (EPS) has been the subject of development by auto manufacturers and suppliers for over a decade because of its fuel economy and ease-of-control advantages compared with the traditional hydraulic power steering (HPS). However, commercialization of EPS systems has been slow and is presently limited to small and midget-class cars due to cost and performance challenges. Among the most challenging technical issues are the pulsating feel at the steering wheel and the audible noise associated with the type of high performance electric drives needed to meet the steering requirements.

The choice of motor type for an EPS determines the characteristics of the drive and the requirements relating to power switching devices, controls, and consequently cost. Leading contenders are the Permanent Magnet (PM) brushless motor, the Permanent Magnet (PM) commutator-type and the switched reluctance (SR) motors; each of the three options has its own inherent advantages and limitations. The PM brushless motor is based upon years of experimenting with commutator-type motors. The large motor size and rotor inertia of commutator-type motors limit their applicability to very small cars with reduced steering assist requirements. Additionally, the potential for brush breakage that may result in a rotor lock necessitates the use of a clutch to disconnect the motor from the drive shaft in case of brush failure. SR drives offer an attractive, robust and low cost option, but suffer from inherent excessive torque pulsation and audible noise, unless special measures are taken to reduce such effects. For column assist applications, the motor is located within the passenger compartment and therefore must meet stringent packaging and audible noise requirements that the present SR motor technology may not satisfy. Therefore, the PM brushless motor with its superior characteristics of low inertia, high efficiency and torque density, compared to commutator motors, appears to have the potential for not only meeting the present requirements but also those of future high performance EPS systems of medium and large vehicles.

Despite the relatively low levels of torque ripple and noise of EPS systems using conventional PM brushless motors, they are no match to the smoothness and quietness of HPS with a decades-long history of performance refinement efforts. Consumers are reluctant in compromising such features. Therefore, a new torque ripple free (TRF) system is needed, which, as the name indicates, would eradicate the sources of torque ripple (under ideal conditions) and reduce noise levels considerably. The near term goal is to enhance the performance of EPS systems with the long-term objective of increasing acceptability of EPS systems for broader usage.

Several performance and cost issues have stood in the way of broad-based EPS commercialization regardless of the technology used, but with varying degree of difficulty. In order to generate motor currents with a sinusoidal shape, the inverter switching devices (e.g. MOSFETS) must be turned on and off at specific rotor angular positions. Therefore, the position of the rotor must be known at all times and an encoder is needed. This requirement is one of the factors adding to the cost of sinusoidal drives, hence traditionally limiting their application to high-performance applications. EPS is a high-performance drive, however it must meet stringent cost limits. Therefore, a new type of encoder is desirable such that it combines high resolution and low cost.

A sinusoidal electric power steering (EPS) system typically requires an incremental position encoder located on a motor shaft for controlling an electric motor. The encoder typically provides two highresolution quadrature pulse trains EA, EB and an index pulse for determining a rotor position. Upon power-up of the sinusoidal electric power steering (EPS) system, it is generally impossible to determine the rotor position of a sinusoidal electric power steering (EPS) system motor by using the incremental encoder signals until the sinusoidal electric power steering (EPS) system motor is moved across or is encountered by the index pulse position for a first time. Thus, before the sinusoidal electric power steering (EPS) system motor is moved across or is encountered by the index pulse position, the sinusoidal electric power steering (EPS) system motor is typically started by using three additional low-resolution commutation sensors which give initial position estimation, as well as directing currents to the desired motor phases.

The two most popular ways to sense rotary position are based on optical detection and magnetic field variation. Optical encoders are temperature limited and susceptible to dirt. Semiconductor based magnetic sensors (magnetoresistors, or MRs), on the other hand, can work at higher temperature, and is starting to be used in underhood applications.

The encoder typically provides two high-resolution quadrature pulse trains EA, EB represent the two quadrature high-resolution incremental pulse trains. The two high-resolution quadrature pulse trains EA, EB are used to determine the sinusoidal electric power steering (EPS) system motor rotation direction and to increment a sinusoidal electric power steering (EPS) system motor rotor position count. The index signal is a pulse that indicates a zero sinusoidal electric power steering (EPS) system motor rotor position. Generally, a set of three signals, denoted by H1, H2, and H3, are low resolution commutation signals with a 120 electrical degree phase shift, corresponding to a three phase motor winding. Typically, the index pulse is generally aligned with phase A, H1 edges. Therefore, the index pulse is derived from phase A, or H1 edges.

Thus, it can be appreciated that for the sinusoidal electric power steering (EPS) system motor, it is desirous to reduce the cost and size or dimension of the encoder. The above mentioned encoding scheme would need at least one encoding track for the two high-resolution quadrature pulse trains EA, EB. In addition, at least three tracks for low resolution commutation signals, i.e. H1, H2, and H3. Therefore, it is desirable to reduce the size and cost of the encoder by reducing the number of tracks on the encoder.

SUMMARY OF THE INVENTION

An encoder for a brushless motor of an Electric Power Steering (EPS) system is disclosed. The encoder includes a commutation track coupled to a shaft for the generation of a commutation signal. The commutation signal in turn is used to generate an index signal every electrical cycle. The encoder further includes a set of high-resolution quadrature signal tracks. The set of high-resolution quadrature signal tracks generate a set of high-resolution signals which are phased at a set angular displacement with respect to one another. A set of sensors sense the commutation signal, and the set of high resolution quadrature signals.

DESCRIPTION OF THE PREFERRED EMBODIMENT

Figure 1:
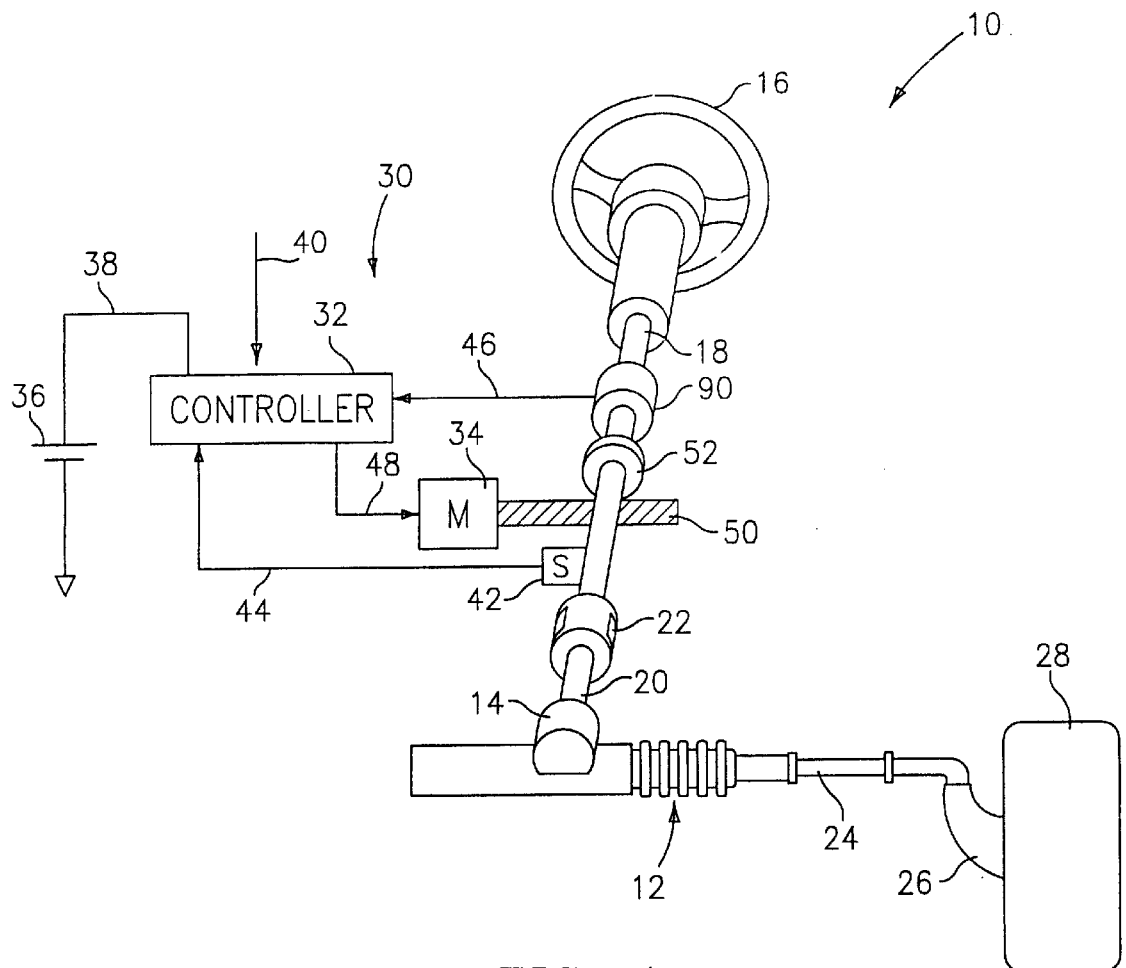
FIG. 1 illustrates a schematic diagram of an electric power steering system.

Referring to FIG. 1, reference numeral 10 generally designates a motor vehicle power steering system suitable for implementation of this invention. The steering mechanism 12 is a rack-and-pinion type system and includes a toothed rack (not shown) and a pinion gear (also not shown) located under gear housing 14. As the steering wheel 16 is turned, the upper steering shaft 18, connected to the lower steering shaft 20 through universal joint 22, turns the pinion gear. Rotation of the pinion gear moves the toothed rack which moves tie rods 24 (only one shown) that in turn move the steering knuckles 26 only one shown), which turn wheels 28 (only one shown).

Electric power steering assist is provided through the unit generally designated by reference numeral 30 and includes a controller 32 and the electric motor 34. The controller 32 is powered by a vehicle power supply 36 through line 38. The controller 32 receives a signal representative of the vehicle velocity on line 40. Steering pinion gear angle is measured through position sensor 42, which may be an optical encoding type sensor, variable resistance type sensor or any other suitable type of position sensor, and fed to the controller 32 through line 44.

As the steering wheel 16 is turned, torque sensor 90 senses the torque applied to the steering wheel 16 by the vehicle operator. The torque sensor 90 may include a torsion bar (not shown) and a variable resistive-type sensor (also not shown) which outputs a variable resistance signal to controller 32 through line 46 in relation to the amount of twist on the torsion bar. Although this is the preferable torque sensor, any other suitable torque-sensing device used with known signal processing techniques will suffice.

In response to the inputs on lines 40, 44, and 46, the controller 32 sends a current command or a voltage command through line 48 to the electric motor 34. The motor 34 in turn supplies torque assist to the steering system through a worm 50 and a worm gear 52, in such a way as to providing a torque assist to the vehicle steering in addition to a driving force exerted by the vehicle operator. Such an electric power steering system is also disclosed in the co-pending United States patent application entitled PASSIVE STARTING OF A TORQUE-RIPPLE-FREE ELECTRIC POWER STEERING SYSTEM having an Attorney docket number of H-202043, filed on the same day and assigned to the same assignee as the present application; which is incorporated herein by reference.

Figure 2:
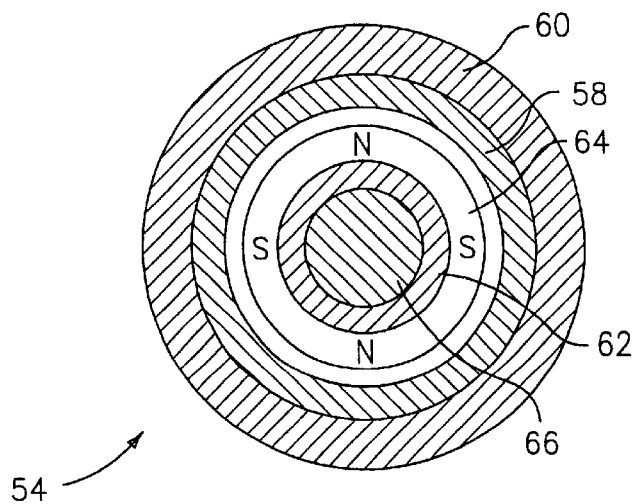
FIG. 2 illustrates a schematic of an embodiment of a motor cross section.

FIG. 2 illustrates a cross section of a motor, such as a permanent magnet brushless motor, which is generally designated by the numeral 54. The motor 54 includes a stator 56 with a slotless air gap winding 58, a yoke 60, also acting as a housing; a rotor 62 with a high energy magnet 64 that is sinusoidally magnetized; and a shaft 66. A high-resolution position sensor is not shown in FIG. 2 with magnetic resistor (MR) sensing elements and steel wheels.

Figure 3:
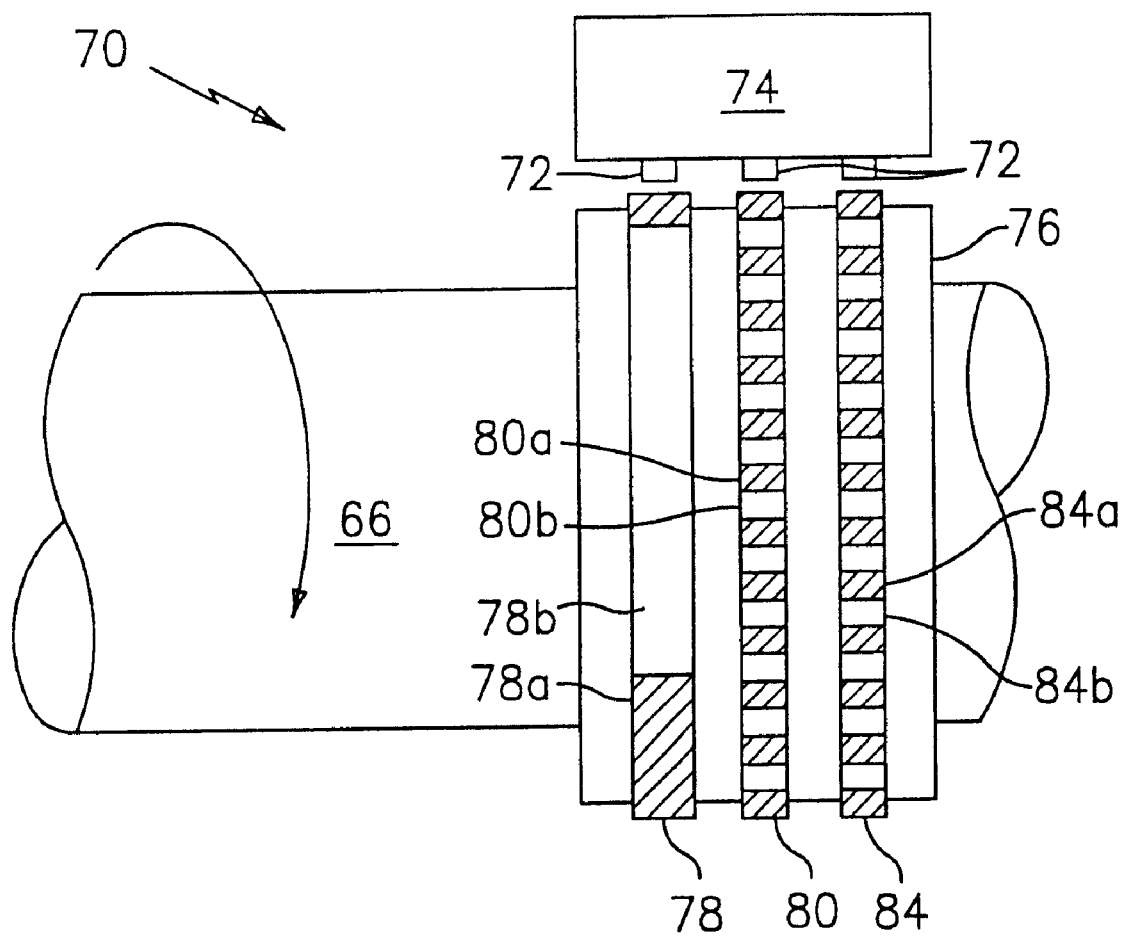
FIG. 3 depicts an encoder for determining the angular position of a motor shaft.

Referring to FIG. 3, a three-in-one encoder system 70 using a set of magnetoresistors 72 (MR) mounted on a stationary permanent magnet 74 is shown. The stationary permanent magnet 74 faces a steel wheel (collar) 76 with three tracks, 78, 80 and 84, each of which has alternating teeth 78a, 80a, 84a and slots 78b, 80b, 84b on their periphery, as shown. The teeth and slots modulate the magnet's field and these variations in magnetic field are sensed by the magnetoresistors 72. The tracks 78, 80 and 84 on the steel wheel 76 allow a sensing by the set of magnetoresistors 72 to perform several functions at the same time. A pair of high-resolution tracks 80 and 84 provide an incremental signal to enable the generation of sinusoidal currents in the motor. The other track, known as the commutation track 78, provides absolute signals at least once every electrical cycle. This absolute signal is used for motor commutation, i.e., to direct the current to the appropriate motor phases, which is particularly important at start up. It is noted that the steel wheel 76 is mounted on the shaft 66.

An encoder needs to have the highest resolution possible while keeping the sensor simple enough for low cost. The more teeth on the wheel periphery, the higher the resolution. There is, however, a practical limit to increasing the number of teeth. This limit is caused by the fact that the magnet 74 cannot be located much closer than 1.5 mm away from the target wheel 76, in order to allow for the MR thickness and protective layers on both the magnet and the MR surface, and to provide some clearance between the sensor and the target. If the features on the wheel periphery are much smaller than the gap between the magnet and the wheel, the magnetic field modulation is insignificant and the signal generated is too small to be useful. The sensor resolution is therefore proportional to the sensor wheel diameter. In this particular application, a single MR would provide only 4 mechanical degree resolution, which is considered insufficient. Therefore, several MRs are used to generate additional signals and increase resolution to a satisfactory level.

Figure 4:
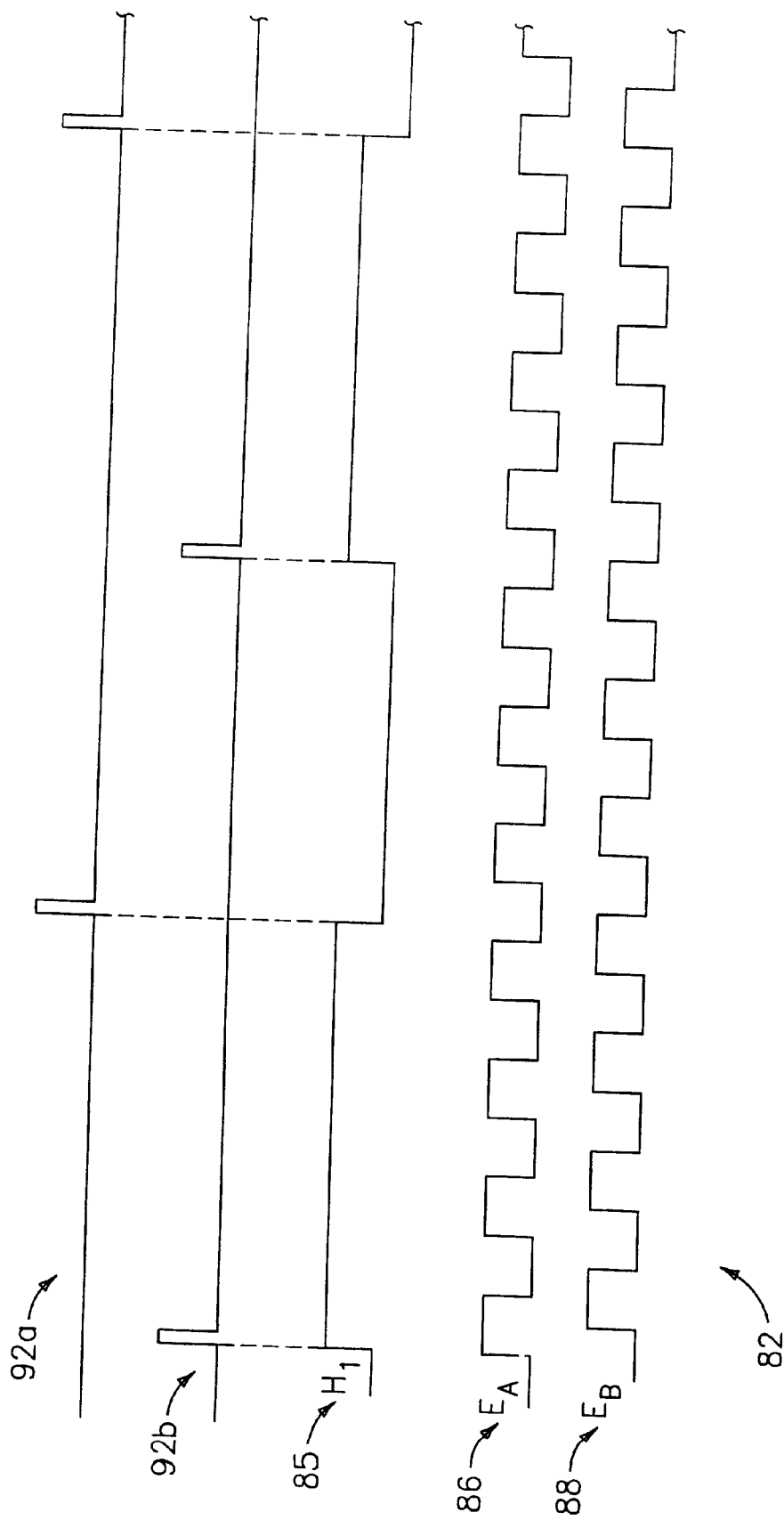
FIG. 4 depicts a commutation signal, an index signal and a set of high-resolution signals generated by the encoder of FIG. 3.

FIG. 4 depicts a set of encoder signals 82 for the sinusoidal EPS system. It is contemplated that the starting procedure for the EPS system based upon the a single commutation sensor for generating the index signal 92a or 92b is as follows: rotate the steering wheel 16 that is connected to the motor shaft 66 through a gearbox to detect signal H1 85. The single commutation signal H1 85 is sampled to obtain the index signal 92a or 92b and to determine the EPS system motor rotor position using high-resolution signals EA 86 and EB 88. The numeral 82 designates the set of encoder signals. Periodic signals which are high-resolution quadrature pulse trains EA 86, EB 88 are used to determine the EPS motor rotating direction as well as to determine the increment of the EPS motor rotator position count. The single commutation signal H1 85 generates an index signal 92a or 92b for every cycle of the commutation track during the start of the EPS motor 34.

It can be appreciated that an encoder that comprises one commutation track and two quadrature high-resolution tracks for operating the permanent magnet (PM) synchronous motor is advantageous. When a permanent magnet (PM) synchronous motor is coupled to a steering wheel for torque assistance purposes, the permanent magnet (PM) synchronous motor need not start from zero speed. A vehicle operator can steer the wheel 16 for a few mechanical degrees in order to activate the motor 34 for EPS assist. As can be appreciated, the reduction of required tracks saves space and cost. Thus, a resultant compact packaging without effecting the machine performance event occurs.

An index pulse 92a or 92b is generated every cycle of the commutation track to start the motor. For example, in a 6-pole PM motor coupled to a steering column with 22:1 gear ratio, the vehicle operator is required to turn the steering wheel 16 for 5.6 mechanical degrees in order to activate the PM motor. However, if one uses an existing sensor that senses once per every mechanical revolution of the permanent magnet (PM) synchronous motor rotor and not using the instant invention, the turning of the steering wheel 16 would be three times more in mechanical degrees as that of the instant invention, i.e., 16.4 mechanical degree. Thus, the advantage of using the commutation signal H1 is shown.

It is noted that the commutation track 78 is used to reset the PM motor rotor angle counter for every electrical cycle for reliable operation even if he loaded number exceeds the required value due to noise.

It can be appreciated that the disclosure includes an encoder that includes a commutation track coupled to a shaft for the generation of commutation signals. The commutation signals in turn are used to generate the index signal 92a, or 92b every electrical cycle. The encoder further includes a pair of high-resolution quadrature signals tracks. The pair of high-resolution quadrature signals generate a pair of high-resolution signals which are phased a set degrees apart. A set of sensors senses the index signal 92a or 92b and the pair of high-resolution quadrature signals.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed are not to be construed as limiting the claims.

What claimed is:

1. An encoder for determining the angular position of a motor shaft, the encoder comprising:
   one commutation track having a first set of alternating teeth and slots coupled to the motor shaft;
   a set of high resolution tracks having a second set of alternating teeth and slots coupled to the motor shaft; and
   a set of sensors for sensing the angular position of the commutation and high resolution tracks.

2. The encoder as set forth in claim 1 wherein the set of sensors comprise a set of magnetoresistors connected to a permanent magnet.

3. The encoder as set forth in claim 2 wherein the set magnetoresistors are positioned between the permanent magnet and the commutation track and the high-resolution tracks.

4. The encoder as set forth in claim 3 wherein rotation of the commutation track past the set of magnetoresistors generates a commutation signal and an index signal each signal having a first and second level.

5. The encoder as set forth in claim 4 wherein the rotation of the high-resolution tracks past the magnetoresistors generates a set of high-resolution signals having a first and second level.

6. The encoder as set forth in claim 5 wherein the high-resolution signals are in quadrature.

7. The encoder as set forth in claim 4 wherein the index signal is generated every cycle of the commutation track.

8. The encoder as set forth in claim 7 wherein the index signal is generated by a rising edge of the commutation signal.

9. The encoder as set forth in claim 7 wherein the index signal is generated by a falling edge of the commutation signal.

10. The encoder as set forth in claim 1 further comprising a collar coupled to the motor shaft wherein the commutation track and the high-resolution tracks are coupled to the collar.

11. A method of determining the angular position of a motor shaft, the method comprising:
    responsive to the rotation of one commutation track of the motor shaft, generating a commutation signal having a first and second level;
    sampling the commutation signal generating thereby an index signal having a first and second level;
    responsive to the rotation of a set of high resolution tracks of the motor shaft, generating a set of high resolution signals having a first and second level.

12. The method as set forth in claim 11 wherein generating a set of high-resolution signals includes generating a set of in quadrature highresolution signals.

13. The method as set forth in claim 11 wherein generating an index signal includes generating the index signal every cycle of the commutation track.

14. The method as set forth in claim 13 wherein generating an index signal includes generating the index signal on a rising edge of the commutation signal.

15. The method as set forth in claim 13 wherein generating the index signal includes generating the index signal on a falling edge of the commutation signal.

16. An electric power steering system comprising:
    a motor;
    a shaft coupled to a rotor of the motor; and
    an encoder including
    one commutation track coupled to the shaft for generating a commutation signal and an index signal every electrical cycle;
    a set of high resolution signals tracks for generating a pair of high resolution signals; and
    a set of sensors sensing the commutation signal and the set of high resolution signals.

17. The electric power steering system of claim 16 wherein the set of high resolution signals are in quadrature.

18. The electric power steering system of claim 16 wherein the sensor comprises a set of semiconductor based magnetic sensors.

19. The electric power steering system of claim 16 wherein the index signal is generated by a rising edge of the commutation signal.

20. The electric power steering system of claim 16 wherein the index signal is generated by a falling edge of the commutation signal.

* * * * *